United States Patent

[11] 3,604,911

| [72] | Inventor | Joseph W. Schmitt |
| | | Cheektowaga, N.Y. |
| [21] | Appl. No. | 824,869 |
| [22] | Filed | May 15, 1969 |
| [45] | Patented | Sept. 14, 1971 |
| [73] | Assignee | Sylvania Electric Products Inc. |

[54] SERIAL-PARALLEL DIGITAL CORRELATOR
8 Claims, 3 Drawing Figs.

[52] U.S. Cl.................................................. 235/181,
178/88, 235/177, 325/324, 328/157
[51] Int. Cl......................................................G06f 15/34,
G06g 7/19
[50] Field of Search.......................................... 235/177,
181; 340/146.2; 325/30, 320, 324, 325

[56] References Cited
UNITED STATES PATENTS
| 3,308,434 | 3/1967 | Glasson et al................. | 235/181 X |
| 3,412,334 | 11/1968 | Whitaker....................... | 235/181 X |
| 3,463,911 | 8/1969 | Dupraz et al. ................ | 235/181 |
| 3,517,175 | 6/1970 | Williams....................... | 235/177 |
| 3,522,541 | 8/1970 | Gooding....................... | 325/324 |

*Primary Examiner*—Eugene G. Botz
*Assistant Examiner*—Felix D. Gruber
*Attorneys*—Norman J. O'Malley, Elmer J. Nealon and Edward J. Coleman

ABSTRACT: A digital correlator for measuring the amount of agreement between two binary sequences comprising a plurality of cascade-connected segment comparators each operative to serially compare the bits within an M-bit segment of the sequences. A summing bus collects in parallel the comparison output signals of the segment comparators and applies them to a detector comprising an integrator and threshold circuit. Each segment comparator comprises a pair of M-bit shift registers each of which processes bits of a respective one of the binary sequences, a pair of exclusive OR gates for controlling serial loading and recirculation of respective registers, clock drive and feedback connections for recirculating the contents of both registers between the loading of each bit into one of the registers, and a modulo 2 adder for serially comparing the outputs of the registers.

(a) RECEIVED SEQUENCE
(b) RECEIVE CLOCK
(c) REFERENCE CLOCK
(d) RECIRCULATE COMMAND

INVENTOR.
Joseph W. Schmitt
BY Edward J...
AGENT.

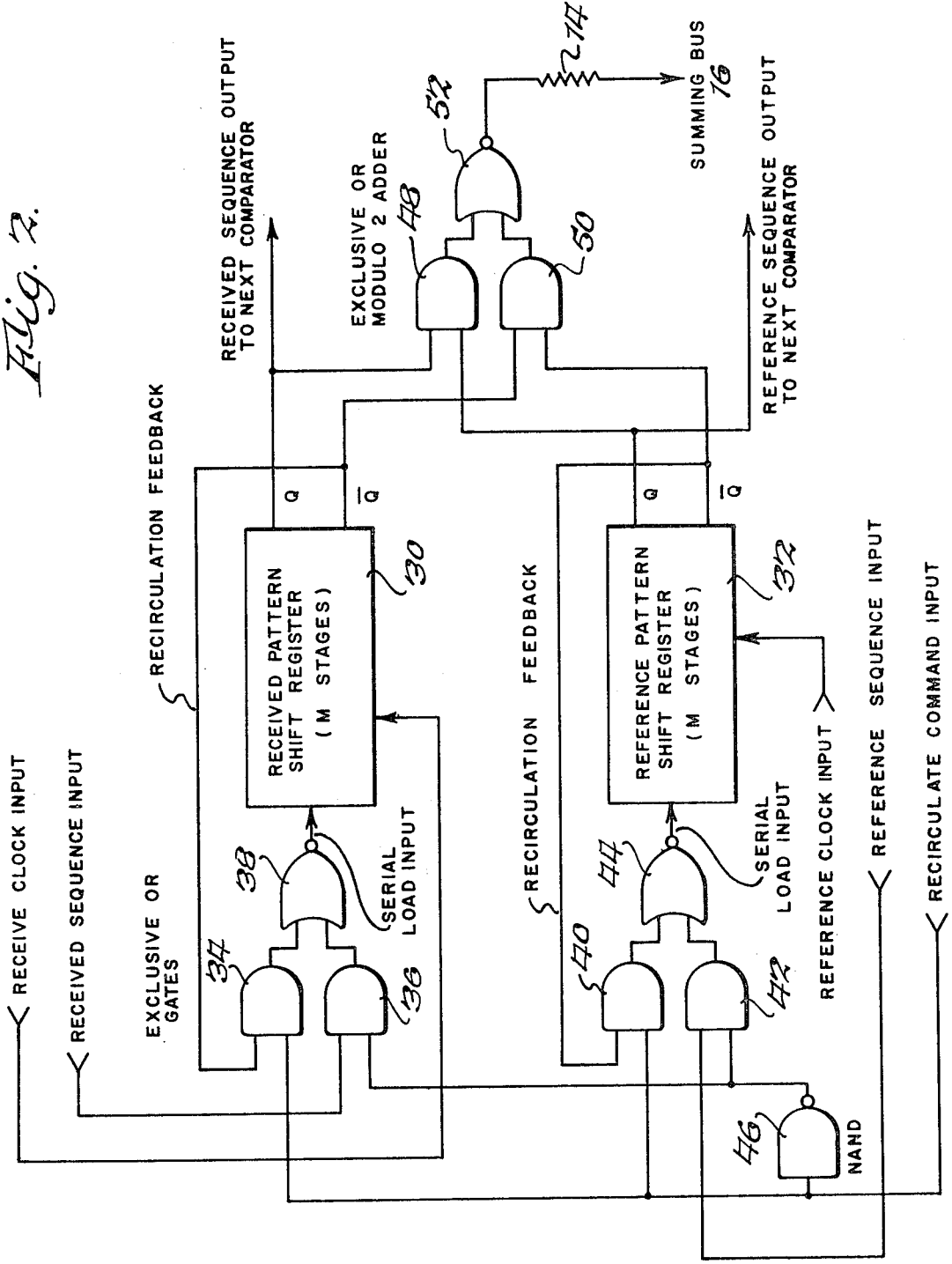

SERIAL-PARALLEL DIGITAL CORRELATOR

BACKGROUND OF THE INVENTION

This invention relates generally to signal correlators and, more particularly, to an improved digital correlator for measuring the amount of agreement between two binary sequences.

The function of a correlator is to generate a cross correlation function indicative of the amount of agreement in time between two signals under consideration. Such cross correlation requires: (1) shifting one of the signals against the other by a time delay; (2) forming the product between instant signal levels; and (3) integrating or averaging the products to provide an output signal. The amplitude of the correlator output signal provides a measure of the number of coincidences taking place between the shifted signal and the reference signal at a given instance. When the output is at a maximum level, correlation is established.

In the case of a digital correlator, the signals to be processed generally comprise two streams of binary coded information, referred to as binary sequences, and the "product" between instant signal levels is obtained by a comparison process. Heretofore, the function of digital correlation in data-processing systems has been provided either by a serial correlator, whereby two streams of binary coded information are serially compared bit by bit by a circuit such as a modulo 2 adder, or a parallel correlator, whereby a plurality of stages of a pair of binary sequence storage devices are compared in parallel. Parallel correlators are particularly useful in applications employing high speed data rates. For example, one application of a parallel correlation concept is described in a copending application, Ser. No. 682,437 of D. J. Gooding, filed Nov. 13, 1967, now U.S. Pat. No. 3,522,541 and assigned to the assignee of the present application. The Gooding application describes a digital matched filter useful in communication systems for synchronizing a received signal with a reference signal to facilitate demodulation. The matched filter heterodynes the received signal into in-phase and quadrature components, which are then quantized and sampled to provide respective binary sequences for application to a parallel digital correlator (called a logic unit in the Gooding application). The parallel correlator is implemented by a plurality of N-stage shift registers of considerable length with parallel logic connections. More specifically, a pair of received pattern registers are provided for propagating binary samples of respective components of the received signal, and a reference pattern register is provided for storing the locally generated binary reference signal. Each stage of each received pattern shift register is compared with a corresponding stage of the reference pattern register by means of an exclusive OR gate functioning as a modulo 2 adder. The parallel comparison output signals are then collected and applied to a detector for determination of code alignment. Hence, although obviously providing a substantial increase in data rate handling capability, this advantage is attained at the expense of a significant increase in circuit complexity, size and power requirements.

SUMMARY OF THE INVENTION

Accordingly, it is an object of the present invention to provide an improved digital correlator for measuring the amount of agreement between two binary sequences.

It is another object of the invention to provide a digital correlator having a substantially higher data rate capability than a serial correlator but which requires fewer components and enables a reduction in size and power requirements as compared with a parallel correlator having the same storage capacity.

Briefly, these objects are attained by a digital correlator comprising a plurality of cascade-connected segment comparators each of which is operative to serially compare the bits within a selected segment of the two binary sequences to be correlated as one sequence is shifted in time with respect to the other. The serial comparison, or product output signals of the segment comparators are then collected in parallel and applied to an integrating detector which is operative in response to the collected signals to provide a measure of the amount of agreement between the two binary sequences.

BRIEF DESCRIPTION OF THE DRAWINGS

This invention will be more fully described hereinafter in conjunction with the accompanying drawings, in which:

FIG. 2 is a logic diagram of a typical one of the segment correlators employed in the present invention.

DESCRIPTION OF PREFERRED EMBODIMENT

For a better understanding of the present invention, together with other and further objects, advantages and capabilities thereof, reference is made to the following disclosure and appended claims in connection with the above-described drawings.

As denoted hereinbefore, the correlator described in the aforementioned Gooding patent application may be called a parallel correlator in that all N-stages of the received and reference pattern shift registers are compared in parallel. The present invention reduces the number and changes the type of components required to achieve advantages of reduced size and power requirements by dividing the N-bit register into M-bit segments. The M-bit segment outputs are collected in parallel, but the M-bits within each segment are compared serially. Accordingly, the present device is referred to as a serial-parallel correlator.

Figure 1:
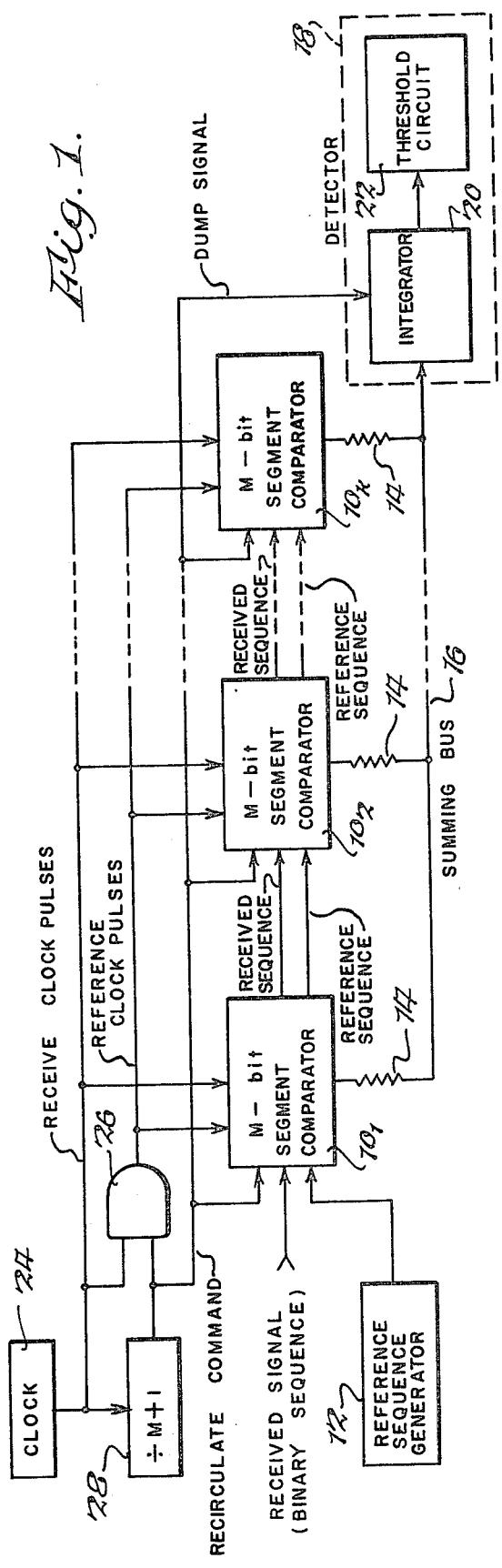
FIG. 1 is a simplified block diagram of a serial-parallel digital comparator according to the present invention.
Figure 3:
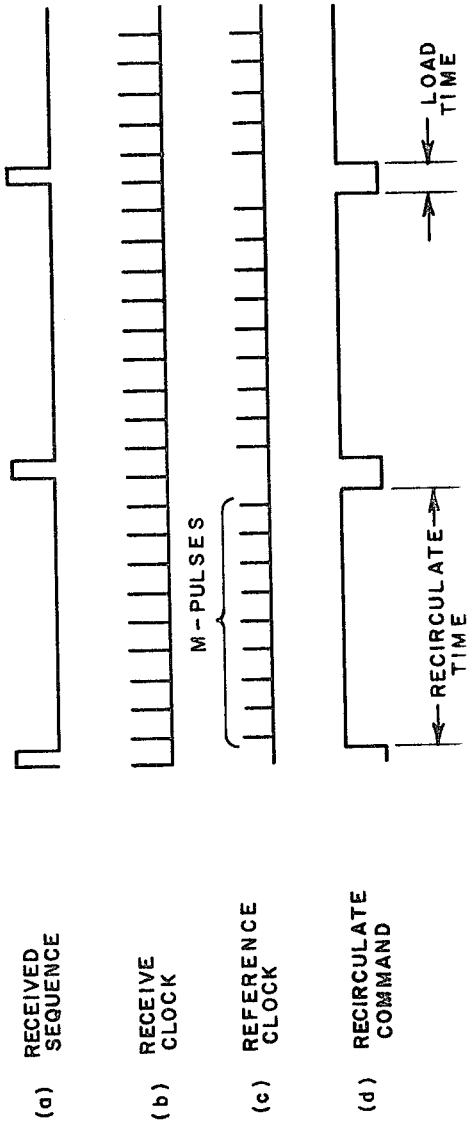
FIGS. 3(a)–(d) are waveform timing diagrams useful in explaining the operation of the apparatus of FIGS. 1 and 2.

FIG. 2 is a block diagram of a single M-bit segment comparator according to the invention. FIG. 1 shows how a plurality of the M-bit comparator of FIG. 2 can be cascaded to form an N-bit serial-parallel digital correlator, and FIG. 3 illustrates typical waveforms at specified points in the circuits of FIGS. 1 and 2 for M=9. It will be noted that the drawings illustrate a correlator for measuring the amount of agreement between two binary sequences, and for purposes of showing a typical application, the invention is exemplified as being used in a radio communication receiver to correlate a received signal with a locally generated reference signal.

Referring to FIG. 1, the serial-parallel correlator of the invention is shown as basically comprising a plurality (K) of cascade-connected M-bit segment comparators $10_1$–$10_k$. The inputs to the first segment comparator $10_1$ include a binary reference sequence input supplied by reference sequence generator 12 and a binary received sequence input. The received sequence may be derived by heterodyning a received signal, such as a coherent biphase modulated carrier, low pass filtering the difference frequency to remove unwanted harmonics, and employing a sampled quantizer to provide the desired digitized signal output for application to the correlator, in a manner similar to the in-phase channel of the aforementioned Gooding patent application. Each of the segment comparators $10_1$–$10_K$ is capable of storing M-bits of the received sequence and M-bits of the reference sequence, and a plurality K of the segment comparators, when cascaded as illustrated, are capable of storing and correlating N-bits of the two input sequences, where N=KM. As will be explained in detail hereinafter, each of the segment comparators $10_1$–$10_K$ is operative to serially compare the M-bits of the received and reference sequences stored therein during a given period and provide comparison output signals, which signals are applied via a resistor 14 to a summing bus 16. The summing bus collects in parallel the serial comparison output signals from each of the segment correlators $10_1$–$10_K$ and applies them to a detector circuit 18 comprising an integrator 20 and a threshold circuit 22. The timing for the comparators is provided by a clock 24, the output of which is connected directly to each of the segment comparators $10_1$–$10_K$ to control processing of the received sequence. Clock pulses for controlling reference sequence processing are provided by an AND gate 26 having one input connected directly to the pulse output of clock 24 and a second input connected to the output of a divide -by- M+1 circuit 28 driven by clock 24. The output waveform of divider 28 is also applied as a recirculate command signal to each of the segment comparators $10_1$–$10_K$.

The pulse train generated by clock 24 is illustrated by FIG. 3(b); it has a rate M+1 times the rate of the received sequence. The rectangular waveform generated by the divider 28, which may comprise a scale of M+1 counter, is illustrated by FIG. 3(d). The relatively positive output level generated by divider 28 for a period including M clock pulses (or nine pulses in the FIG. 3 example) is operative to enable AND gate 26 to pass M, or nine, clock pulses. The relatively negative output level from divider 28 during the M+1 pulse (or tenth pulse in the illustrated example) inhibits the M+1, or tenth, clock pulse to thereby provide the reference clock pulse stream shown in FIG. 3(c) as an input to each of the segment comparators $10_1$–$10_K$.

As illustrated in FIG. 2, each of the segment $10_1$–$10_K$ comprises two M-stage shift registers, one register 30 for processing the received pattern and another register 32 for the reference pattern, each having a clock input, a serial load input and a pair of complementary serial outputs, designated Q and Q̄. Recirculating and loading of the received pattern register 30 is controlled by an exclusive OR gate logic circuit comprising AND gates 34 and 36 and NOR gate 38, while the input to the reference pattern register 32 is controlled by the exclusive OR gate logic circuit comprising AND gates 40 and 42 and NOR gate 44. The received sequence input signal is applied to one input of AND gate 36; the reference sequence input signal is connected to one input of AND gate 42; and the recirculate command input signal from divider 28 is connected directly to inputs of AND gates 34 and 40 and through a NAND gate 46 to second inputs of AND gates 36 and 42. A recirculation feedback path is connected from the Q output of the received pattern register 30 to a second input of AND gate 34, and the Q output of the reference register 32 is connected to a second input of AND gate 40. The outputs of gates 34 and 36 are connected through NOR gate 38 to the serial load input of the received pattern register 30, and gates 40 and 42 are connected through gate 44 to the serial load input of the reference register 32.

The outputs of the received and reference pattern registers are serially compared in an exclusive OR circuit which functions as a modulo 2 adder; the circuit comprises AND gates 48 and 50 and NOR gate 52. The Q outputs of the registers are connected to inputs of AND gate 48, and the Q̄ outputs are connected to inputs of AND gate 50. The output of NOR gate 52 is connected through resistor 14 to the summing bus 16.

The Q outputs of the received and reference pattern registers are also connected to the received and reference sequence inputs of the next cascaded M-bit segment comparator. Hence, referring also to FIG. 1, whereas the source of received sequence for input to gate 36 in segment comparator $10_1$ would perhaps be a quantizer following heterodyning and filtering in the receiver, the source of the received sequence for input to gate 36 in segment comparator $10_2$ is the Q output of register 30 in segment comparator $10_1$. Likewise, although the reference sequence source for input to gate 42 in segment comparator $10_1$ is the output of sequence generator 12, the source of the reference sequence for input to gate 42 of segment comparator $10_2$ is the Q output of register 32 in segment comparator $10_1$. In this manner, the K-segment correlators provide a pair of continuous shift registers for storing N-bits of the received and reference sequences, where N=KM.

The operation of a typical one of the M-bit segment comparators will now be described with reference to FIGS. 2 and 3. For tutorial purposes, the segment comparator of FIG. 2 initially will be described as if it were the only M-bit comparator connected to the summing bus, and thereafter, the contributing effect of the K-1 other segment correlators to the overall operation of the serial-parallel digital correlator will be described.

Referring first to FIG. 3, waveform (a) represents the received sequence as a series of three binary 1's, indicated by three spaced apart pulses at the input data rate. This is a quantized and sampled signal similar to that shown in FIG. 4H of the aforementioned Gooding application. Waveform (b) illustrates the received clock input provided by clock 24, which comprises a train of pulses at M+1 times the input data rate. The reference clock input provided by AND gate 26 is illustrated by waveform (c); it comprises a pulse train at a rate M+1 times the input data rate but with every M+1 pulse deleted. Waveform (d) illustrates the recirculate command signal provided by divider 28; the period occupied by the relatively positive portion of this rectangular waveform is designated "recirculate time," and the period occupied by the relatively negative portion of the waveform is denoted "load time."

When the recirculate command is present, that is during the "recirculate time" of waveform (d), gates 36 and 42 are disabled to inhibit the respective binary sequence input lines, and gates 34 and 40 are enabled to permit the contents of the registers to be recirculated in response to applied clock pulses. When the recirculate command is not present, that is during the "load time" of waveform (d), gates 34 and 40 are disabled to inhibit the recirculation feedback inputs, and gates 36 and 42 are enabled to permit new bits of the received and reference sequences to be loaded into the registers. As previously noted, however, AND gate 26 is operative to inhibit application of the M+1 reference clock pulse to register 32, so that only the receive pattern register 30 is clocked during the "load time" to load a new bit of the received sequence into the register. In this manner, the received sequence is shifted against the stored reference sequence by a one bit time delay. Accordingly, the aforementioned recirculation feedback and logic connections are operative to recirculate the contents of registers 30 and 32 between the loading of each bit of the receive sequence into the receive pattern register 30, and to provide a one bit shift between sequences during each "load time."

The correlation function is accomplished by storing a segment (M-bits) of a reference sequence and attempting to match it with an M-bit segment of the received sequence. If the segments do not match, a new segment of received sequence is compared with the original reference segment. This shifting process is continued until a match is obtained.

The operation may be divided into three steps comprising: (1) initial loading, (2) recirculation and serial comparison, and (3) one-bit shifting of the stored received segment.

The first step, the initial loading operation, is not shown in the waveforms of FIG. 3. With the recirculate command absent, M-clock pulses at the input data rate of the received sequence are applied to both the received and reference pattern shift registers 30 and 32. This loads an M-bit segment of the received and reference binary sequences into the segment comparator of FIG. 2. During this initial loading operation, of course, the previously described output of clock 24, represented by waveform (b), is inhibited, and a new source of clock pulses is connected to clock both the reference and receive registers of each of the segment comparators $10_1$–$10_K$.

The second operational step may be described as follows. With the recirculate command present, that is during the "recirculate time" of waveform (d), M additional clock pulses at a rate M+1 times the input data rate are applied to both registers 30 and 32, as illustrated in FIG. 3 by waveforms (b) and (c) with respect to (d). During this time, the binary sequence inputs are inhibited and the shift registers are recirculated. Each set of bits shifted out of the registers in this process are applied to the output exclusive OR modulo 2 adder for serial comparison. The result is a product signal on the summing bus 16 for each pair of bits compared, a logic 1 for disagreement and a logic 0 for agreement. More specifically, in response to the first recirculate clock pulse applied to the registers, the Q-outputs for the first bits of the received and reference segments are applied to gate 48 for comparison, and the Q outputs are applied to gate 50. If the first reference and received bits are both 1's, a logic 0 will be generated by gate 48; if the bits are both 0's, a logic 0 will be generated by gate 50. A disagreement between the bits will result in a logic 1 being generated from gate 52. The second clock pulse applied during recirculation causes the second bit of each segment to be compared, and after M clock pulses, all M-bits of the stored segments have been compared. Referring to detector 18 of FIG. 1, integration of the signals on summing bus 16 during this interval yields a value proportional to the total agreements in the M-bit segment. This is a measure of the amount of agreement, or correlation, between the received and reference segments. The threshold circuit 18 exceedance level is set to generate an agreement signal upon detecting an integrator 20 output value proportional to M-agreements or some specified number less than M-agreements, again assuming only one of the segment correlators is connected to the summing bus. After M-clock pulses, during the load time of waveform (d) and the occurrence of the M+1 clock pulse, integrator 20 is dumped so that it is at a zero amplitude level in preparation for the next recirculate and serial comparison interval. This function may be accomplished by employing as integrator 20 an integrate and dump filter of the type described in U.S. Pat. No. 3,056,890, arranged to be quenched at the end of each recirculate interval, during the load time, in response to a dump signal. The output of divider 28, waveform (d), provides a suitable dump signal in its negative going load time pulse, and thus is shown in FIG. 1 as being connected to integrator 20 to provide this functional input.

If an agreement signal is not obtained, a detector feedback signal (not shown) permits the correlator timing to continue into the third step of operation. As shown in FIG. 3, this results in removal of the recirculate command for a period, denoted load time, sufficient to allow a single clock pulse, the M+1 pulse, to be applied to the received pattern shift register 30. AND gate 26 inhibits a pulse on the reference clock line during this load time interval. As a result, the stored received segment shifts one bit with respect to the stored reference segment, and a new bit from the received sequence is loaded into register 30. At the same time, the first bit from the original M-bit received segment is shifted out of register 30 and loaded into the received pattern register of the next cascaded correlator.

The above described second and third operational steps are continually repeated until the threshold circuit generates an agreement signal at which time the correlation process is terminated.

Once agreement has been indicated, gate 26 may be bypassed so as to apply the clock 24 output pulse train, waveform (b) of FIG. 3, directly to the reference pattern register 32, whereby that register is also clocked with the M+1 pulse. During load time in this mode, therefore, new bits of both the received and reference sequences are shifted into the segment comparator. The output of threshold circuit 22 may then be continuously monitored to indicate continued alignment or synchronization of the received and reference sequences.

In order to correlate N-bits of a received sequence, where N=KM, the overall operation of the K cascaded M-bit segment comparators $10_1$-$10_K$ must be considered, as illustrated in FIG. 1, with summing bus 16 connected to the output of the modulo 2 adder in each of the segment comparators. The K-cascaded reference registers may be loaded at any time prior to the comparison process and at any convenient clock rate. The N-received sequence stages of the K-segment comparators are initially loaded by applying KM-clock pulses at the input data rate to all of the receive pattern registers. A meaningful correlation process, of course, does not commence until after all N-stages are loaded. The waveforms of FIG. 3 are then applied to all K-segment comparators to generate simultaneous serial comparisons in each M-bit comparator. Integration of the signals on the summing bus during the recirculate time yields a value proportional to the total number of agreements in K of the M-bit segments. This is a measure of the amount of agreement, or correlation, between N-bits of the received and reference sequences. The threshold circuit exceedance level is set to generate an agreement signal upon detecting an integrator output value proportional to KM-agreements or some specified number less than KM-agreements. As each load time occurs (after M-clock pulses), the integrator is dumped, and one bit is transferred from each M-bit comparator to the next. As a result, the entire stored N-bit received sequence shifts one bit with respect to the N-bit stored reference sequence, and a new bit from the incoming received sequence is loaded into the received pattern register of comparator $10_1$.

By the addition of another string of received pattern registers to the FIG. 1 implementation, the present invention is readily adapted to correlate quadrature components, as in the aforementioned Gooding patent application. Of course, this would require the inclusion of squaring and summing circuits between the integrators 20 at the end of each summing bus and the threshold circuit 22. Detector 18 may also include an analog-to-digital converter between integrator 20 and threshold circuit 22.

It will be noted that the serial-parallel digital correlator of the present invention is limited to lower data rate applications than a parallel correlator, such as that employed in the aforementioned Gooding application. Whereas a parallel correlator is limited only by the speed of operation of its shift register flip-flop stages, the present serial-parallel correlator, since it must shift M times before a new bit is loaded, has a maximum data rate capability equal to that for the parallel correlator divided by approximately M+1.

Although having a somewhat lower data rate capability than a parallel correlator, the present invention obviously provides a substantially higher data handling capability than a serial correlator and exhibits the following significant advantages with respect to the parallel correlator.

As illustrated in FIG. 2, the present invention requires only three, rather than M, exclusive OR gates for every M-stages of comparison; the parallel correlator requires an exclusive OR gate for each stage of comparison.

The M-stage registers require outputs only from the last stage. This permits the use of integrated circuit packages which require less power than those having outputs from each stage; actually about a 3:1 reduction in power for the registers. The advantage requiring fewer exclusive OR gates together with the last mentioned advantage provide approximately a 4:1 total reduction in required power.

The fact that the outputs are not required from each shift register stage also permits the use of fewer integrated circuit stages to implement an M-stage register. Typically, there are about one or two flip-flops per integrated circuit package with outputs from each stage, as opposed to about eight flip-flops per integrated circuit package having an output from only the last stage. As N becomes larger the above noted advantages become increasingly significant.

I claim:

1. A digital correlator for generating an output signal indicative of the amount of agreement between first and second binary sequences comprising, in combination, a plurality of cascade-connected segment comparators each of which is operative to store and serially compare the bits within a selected segment of said first and second binary sequences and to provide a serial comparison output signal, means for serially loading bits of said first and second binary sequences into said segment comparators, means for recirculating the bits stored in each of said segment comparators between the loading of each bit of said first sequence, means for collecting in parallel the serial comparison output signals of said segment comparators, and detector means operative in response to said collected comparison signals to provide a measure of the amount of agreement between said first and second binary sequences.

2. A digital correlator in accordance with claim 1 wherein each of said segment comparators includes first and second shift registers and means for serially comparing the outputs of said first and second registers, said loading means includes means for serially loading bits of said first binary sequence into said first register and means for serially loading bits of said second binary sequence into said second register, and said recirculating means includes means for recirculating the contents of said first and second registers between the loading of each bit of said first sequence into said first register.

3. A digital correlator in accordance with claim 2 wherein said serial comparison means comprises a modulo 2 adder having inputs connected to the serial outputs of said first and second registers.

4. A digital correlator in accordance with claim 3 wherein said means for loading said first register comprises a first logic circuit having an input connected to a source of said first binary sequence and an output connected to the serial input of said first register, and said means for loading said second register comprises a second logic circuit having an input connected to a source of said second binary sequence and an output connected to the serial input of said second register.

5. A digital correlator in accordance with claim 4 wherein said sources of first and second binary sequences for at least one of said segment comparators respectively comprise serial outputs of first and second shift registers in a preceding one of said cascaded segment comparators.

6. A digital correlator in accordance with claim 4 wherein said first and second registers each have M-stages, and said recirculating means includes a feedback connection from a serial output of said first register to an input of said first logic circuit, a feedback connection from a serial output of second register to an input of said second logic circuit, means for applying clock pulses to drive said first and second registers at a rate M+1 times the bit rate of said first binary sequence, and means for controlling said first and second logic circuits to enable the recirculating feedback inputs thereof and to inhibit the first and second binary sequence inputs thereof for a period of at least M-clock pulses.

7. A digital correlator in accordance with claim 6 wherein said control means for said first and second logic circuits is further operative to inhibit the feedback inputs thereof and to enable the binary sequence inputs thereof during the M+1 clock pulse, and said means for applying clock pulses is further operative to inhibit application of the M+1 clock pulse to said second register.

8. A digital correlator in accordance with claim 7 wherein said means for collecting the serial comparison output signals of said segment comparators comprises a summing bus connected to the output of the modulo 2 adder in each of said segment comparators, and said detector means comprises an integrator having an input to which said summing bus is connected, means for dumping said integrator during the M+1 clock pulse, and a threshold circuit connected to the output of said integrator.